United States Patent [19]

Friedlander et al.

[11] Patent Number: 4,695,493
[45] Date of Patent: Sep. 22, 1987

[54] PEEL-AND-STICK CARPET ASSEMBLIES, COMPONENTS THEREOF AND METHODS OF CONSTRUCTION

[75] Inventors: Randal H. Friedlander; Sheryl A. Nash; Greg A. Komitor, all of Columbus, Ohio

[73] Assignee: Century Adhesives Corp., Columbus, Ohio

[21] Appl. No.: 941,752

[22] Filed: Dec. 15, 1986

[51] Int. Cl.⁴ .............................................. B32B 33/00
[52] U.S. Cl. ...................................... 428/40; 428/95; 428/97; 428/215; 428/256
[58] Field of Search .................... 428/40, 95, 215, 256, 428/97

[56] References Cited

U.S. PATENT DOCUMENTS 4,554,194  11/1985  Haas et al. ............................. 428/40
4,647,484  3/1987  Higgins ................................. 428/40

Primary Examiner—Marion C. McCamish
Attorney, Agent, or Firm—Carroll F. Palmer

[57] ABSTRACT

Peel-and-stick carpet assemblies capable of being formed and reformed mechanically or by hand without requiring application of heat thereto in a stable three-dimensional contoured shape that does not exhibit any appreciable shrinkage or stretching and will remain substantially unchanged in any of its three dimensions throughout storage prior to application to a substrate to be covered thereby and during normal life of use thereof after such application are formed of a carpet layer, a shape-retention web, a special adhesive layer sandwiched between the carpet layer and the web front surface adhering the web to the carpet layer, a unique pressure-sensitive adhesive layer covering the rear surface of the web, and a release sheet releasably adhered to the pressure-sensitive adhesive layer. In preferred carpet assemblies, the shape-retention web is aluminum metal foil of thickness about 1 to 10 mil.

8 Claims, 8 Drawing Figures

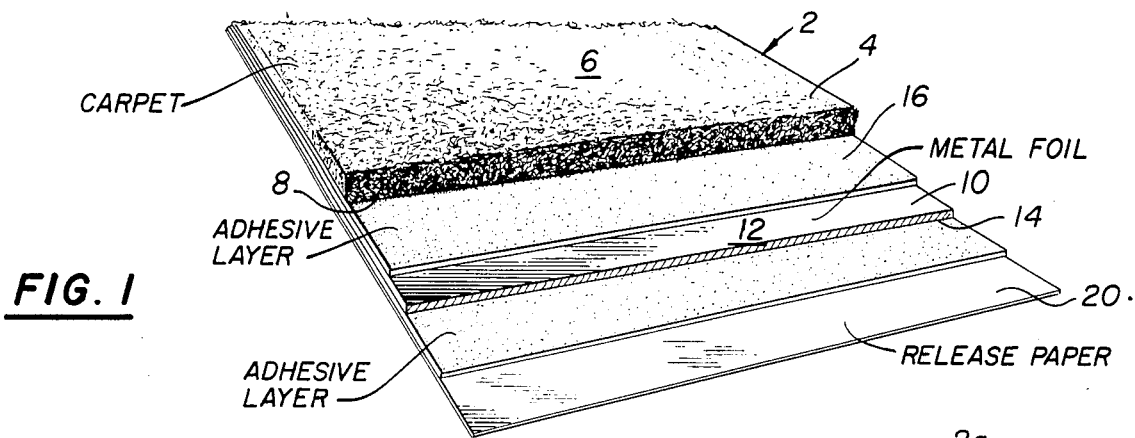
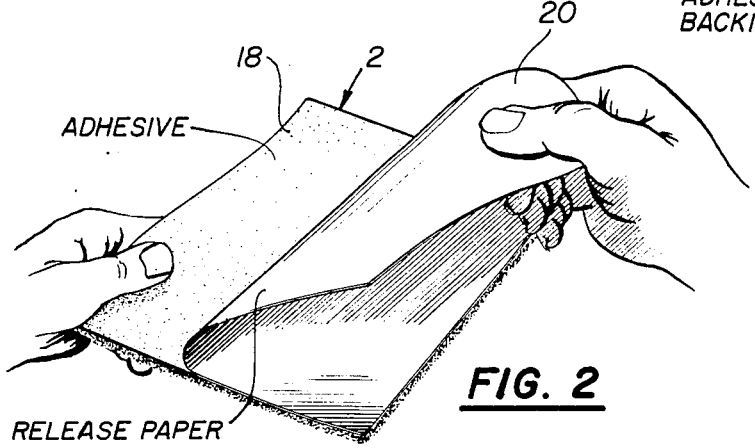
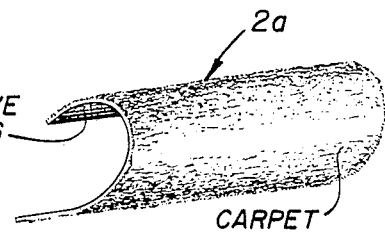
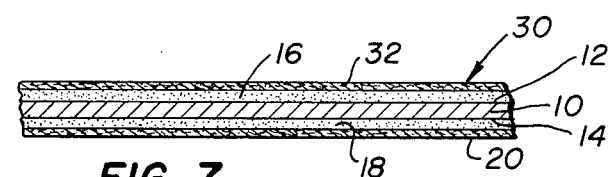
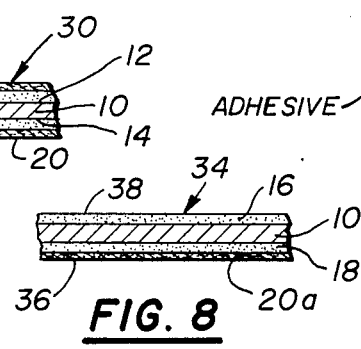
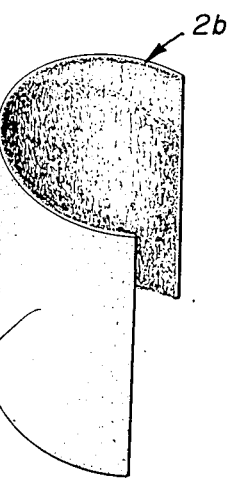
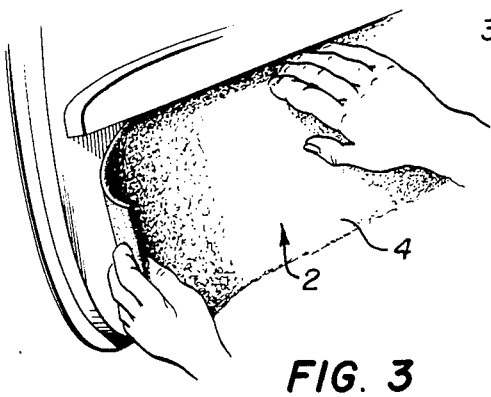
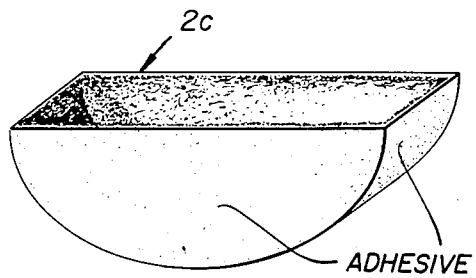

PEEL-AND-STICK CARPET ASSEMBLIES, COMPONENTS THEREOF AND METHODS OF CONSTRUCTION

BACKGROUND OF THE INVENTION

1. Field of the Invention

This invention relates to carpet products capable of being formed without need to use of heat into contoured shapes. More particularly, it concerns such products having a pressure-sensitive adhesive surface protected by a release sheet what can be peeled off allowing the shaped carpet assembly to be installed on the surface for which it has been contoured, i.e., so-called peel-and-stick carpet products.

2. Description of the Prior Art

Large quantities of carpeting are used for other purposes than for covering floors or stairs in buildings. By way of example, much carpeting material is used by the automobile industry to cover various interior surfaces of cars and trucks to provide soundproofing; to cover door panels or other exposed, unfinished areas; to line car trunks; etc.

In order to reduce time consuming tasks of fitting, cutting and seaming to effect such installations of carpeting in vehicle interiors, composite carpet products have been developed that can be precut to size and preformed, i.e., contoured, as one-piece, form-fitting units that can be shipped directly to auto assembly plants and installed easily in cars, e.g., see U.S. Pat. Nos. 3,673,034 and 4,230,755.

In addition to pre-cutting and pre-shaping, the pre-application of pressure-sensitive adhesive to the back side of such carpet products furher assists in the rapid installation of the product to the surface for which they have ben contoured. To protect such backing adhesives, a release sheet (liner) is applied over them which can be peeled off just before the carpet product is applied to the substrate to be covered. Hence, such articles of manufacture are referred to in the trade as "peel-and-stick" and such term is used herein as a means for generically identifying this class of articles.

Another innovation for these carpet articles is the incorporation of a scrim (a fabric or carrier) within the back adhesive layer to impart longitudinal dimensional stability to the product. This stability mitigates carpet stretching when the release sheet is removed.

While these various innovations have been developed for improvement of peel-and-stick carpet assemblies, problems still exist relative to their constructions, installation, etc. For example, a typical method of preshaping the carpet assemblies is to apply heat thereto and then press or mold the assembly into the desired shape. Unfortunately, components of such prior products exhibit an elasticity or hysteresis which, with the passage of time, causes the preformed item to creep back to its original, flat shape. Also, where heat is required to shape or reshape the carpet product, it can be satisfactorily reshaped right at the time of installation on the substrate where this may be necessary to compensate for slight variations in the substrate contour from the standard pattern.

OBJECTS

A principal object of the invention is improvements in carpet products of the precut, preshaped class.

Further objects include the provision of:

1. New peel-and-stick carpet assemblies capable of being formed and reformed mechanically or by hand without requiring application of heat thereto into a stable three-dimensional contoured shape.
2. Such carpet assemblies that do not exhibit any appreciable shrinkage or stretching an will remain substantially unchanged in any of its three dimensions throughout storage prior to application to a substrate to be covered thereby and during normal life of use thereof after such application.
3. New precut, contoured carpet products whose shape may be adjusted at an utilization site, e.g., an automobile assembly plant, so that malformed products need not be rejected and scrapped.
4. New methods for the manufacture of such peel-and-stick carpet assemblies.
5. New pressure-sensitive adhesives having unique adhesion and dimensional change resistant values for use in the production of such carpet assemblies.
6. New laminated adhesive products for use in the construction of three-dimensional carpet assemblies.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the provision of new peel-and-stick carpet assemblies capable of being formed and reformed mechanically or by han without requiring application of heat thereto into a stable three-dimensional contoured shape that does not exhibit any appreciable shrinkage or stretching and will remain substantially unchanged in any of its three dimensions throughout storage prior to application to a substrate to be covered thereby and during normal life of use thereof after such application.

The new carpet assemblies comprises (1) a carpet layer having a front surface and a rear surface, (2) a shape-retention metallic web of thickness between about 1 to 100 mil having a front surface and a rear surface, (3) a first adhesive layer of thickness between about 1 to 30 mil sandwiched between the carpet layer rear surface and the web front surface adhering the web to the carpet layer, (4) a second adhesive layer of thickness between about 1 to 20 mil covering the rear surface of the web, and (5) a release sheet of thickness between about 1 to 10 mil releasably adhered to the second adhesive layer.

The first adhesive layer is formed from a hot melt adhesive composition comprising the following ingredients in the indicated percentages by weight:

| | |
|---|---|
| styrene-unsaturated hydrocarbon-styrene block copolymer | 30–50% |
| tackifying resin | 35–50% |
| reinforcing resin | 0–10% |
| plasticizer | 5–20% |
| degradation inhibitor | 0–5%. |

The secon adhesive layer can the same as or different from the first adhesive layer and is formed from the hot melt adhesive having a composition as stated above.

The shape-retention web is a sheet or mesh of metal, metal alloy or equivalent.

In preferred embodiments, the hot melt adhesives for the first and second adhesive layer have the following composition:

| | |
|---|---|
| styrene-unsaturated hydrocarbon-styrene block copolymer | 30-45% |
| tackifying resin | 35-50% |
| reinforcing resin | 1-10% |
| plasticizer | 5-20% |
| degradation inhibitor | 0-5% | and the shape-retention web is an aluminum metal foil 1 to 10 mils in thickness having a tensile strength of between about 10,000 to 45,000 psi. and a yield strength of between about 4,000 to 37,000 psi.

The objects are further accomplished by the provision of new laminated products for use in construction of peel-and-stick carpet assemblies having the capabilities aforesaid comprising (a) a shape-retention web of thickness between about 1 to 100 mil having a front surface and a rear surface, (b) a first pressure-sensitive adhesive layer of thickness between about 1 to 30 mil covering the web front surface, (c) a second pressure-sensitive adhesive layer of thickness between about 1 to 20 mil covering the rear surface of the web, and (d) a release sheet of thickness between about 1 to 10 mil releasably adhered to the second adhesive layer.

The first and second pressure-sensitive adhesive layers of such laminated products are formed from hot melt adhesive compositions comprising the ingredients in the indicated percentages by weight as stated above relative to the new carpet products. The shape-retention webs used in the new laminated products are also like those of the new carpet products.

BRIEF DESCRIPTION OF THE DRAWINGS

A more complete understanding of the invention may be had by reference to the accompanying drawings in which:

FIG. 1 is perspective view of a new peel-and-stick carpet assembly of the invention with edge portions thereof cut back to illustrate the construction thereof.

FIG. 2 is a perspective view of the product of FIG. 1 being handled for installation on a substrate.

FIG. 3 is a perspective view of a carpet product of the invention being installed on the side door panel of an automobile.

FIG. 4 is a perspective view of a carpet assembly of the invention preshaped for application to a contoured substrate, e.g., the map pocket exterior of an automobile.

FIG. 5 is a perspective view of another preshaped carpet assembly of the invention.

FIG. 6 is a perspective view of a carpet assembly of the invention preshape to cover the surface of the tire well of an automobile.

FIG. 7 is an enlarged, sectional view of one embodiment of a new laminated adhesive product of the invention.

FIG. 8 is an enlarged, sectional view of another embodiment of a new laminated adhesive product of the invention.

DESCRIPTION OF THE PREFERRED EMBODIMENTS

Referring in detail to the drawings, in which identical parts are identically marked, the invention involves a new carpet assembly 2 that comprises a carpet layer 4 having a front surface 6 and a rear surface 8. There is also a shape-retention web 10 having a front surface 12 and a rear surface 14. A first adhesive layer 16 is sandwiched between the carpet layer rear surface 8 and the web front surface 12 adhering the web 10 to the carpet 4. The rear surface 14 of the web 10 is covered by a second adhesive layer 18 and a release sheet 20 completes the assembly 2.

As illustrated by FIG. 2, the sheet 20 is releasably adhered to the second adhesive layer 18 and serves to prevent the adhesive 18 from adhering to anything until it is time for the carpet product 2 to be installed on a substrate surface. After the release sheet 20 has been removed from the carpet assembly 2, it can be applied easily and quickly as shown in FIG. 3 to the substrate for which it has been precut and contoured, e.g., car door inside panel.

The new carpet products can be performed into a variety of complex shapes to fit various contours of the surfaces to be covered thereby. These may be a convex shape 2a (FIG. 4) or a concave shape 2b (FIG. 5). Further, by combining a plurality of precut pieces, some of which are bent into a shape, while others are not, additional types of covering products can be formed, such as a spare wheel recess cover 2c (FIG. 6).

In addition to the complete carpet assemblies 2, the invention involves new forms of laminated products to be used in constructing such carpet products. Such a laminated product 30 comprises a shape-retention web 10 having a front surface 12 and a rear surface 14. A first pressure-sensitive adhesive layer 16 covers the web front surface 12 and a second pressure-sensitive adhesive layer 18 covers its rear surface 14. A release sheet 20 is releasably adhered to adhesive layer 18 and a similar release sheet 32 is likewise adhered to adhesive layer 16. By peeling the sheet 32 from the product 30, it can be adhered to the bak of a section of carpeting (not shown) to create a carpet assembly like product 2 of FIG. 1. As the numeral designations in FIG. 7 indicate, the shape-retention web and adhesive layers of the product 30 are like those of the carpet assembly 2 of FIG. 1.

The invention also involves an alternative form of laminated product 34 which is like product 30, but omits the second release sheet 32. In practice, such a product would have a release sheet 20a which is coated on both surfaces with release compositions so that the product 34 can be rolled into a roll with the adhesive 16 engaging the back surface 36 of the sheet 20a. When such a supply roll is used to construct a carpet assembly 2, the laminate 34 is unrolled and the then exposed surface 38 of adhesive layer 16 is adhered to the back side of carpeting to form the final carpet assembly 2.

A great variety of carpeting can be use in construction of the new carpet assemblies 2 of the invention. Needlepressed or tufted nonwoven fiber webs are particularly useful since then provide desired qualities, e.g., abrasion resistance, flexibility, etc., at low cost. However, most any other carpeting of about 0.1 to 0.5 inch thickness can be used in accordance with the invention, e.g., tufted nylon carpeting, knitted fabrics, woven fabrics and like carpeting.

A host of release web materials for use as release sheets 20, 20a and 32 are commercially available. Typically, such sheets can comprise a unified paper or polyolefin base which has been surface treated with silicone, fatty alkyl polymer, phosphate ester, fatty amide or like compositions known to be non-adhesive to pressure-sensitive rubber or polymer base adhesives. Examples of such materials are disclosed, for example, in U.S. Pat. Nos. 2,607,711, 2,822,290, 2,880,862, 2,913,355 and 2,914,167, the disclosures of which are incorporated herein by reference.

The shape-retention webs advantageously used in accordance with the invention are metal foil of aluminum alloys of about 1 to 10 mil thickness, especially 1-8 mil, typically 5 mil. Preferably, such foils are of the soft temper type and have a density of about 0.1 lbs/cu.in., a tensile strength of about 12,000-45,000 psi., typically 12,000 psi., an yield strength of about 4000-37,000 psi., typically 4000 psi and contain 95.0-99.9% by weight aluminum. Temper is quantified by the yield strengths and tensile strengths. The ASTM methods for testing are E10 (Hardness) an E345 (Tension).

Particularly useful foils are made of aluminum alloys having the composition:

| | |
|---|---|
| aluminum | 95.0-99.9% |
| silicon | 0.0-1.0% |
| iron | 0.0-1.0% |
| copper | 0.0-0.2% |
| chromium | 0.0-0.5% |
| manganese | 0.0-2.0% |
| magnesium | 0.0-3.0%. |

Other shape-retention webs include metallic mesh or screen, particularly, aluminum alloy mesh or screen or equivalent web products. Any metallic mesh or sheet exhibiting similar physical properties of hardness and tensile could also be used. For example, certain zinc or copper alloys would be viable substitutes for aluminum alloys.

The hot melt pressure-sensitive adhesives of the invention used for the creation of the adhesive layers 16 an 18 etc. must provide the desired adhesion values and resistance to extreme conditions. Adhesive compositions discovered to possess the needed qualities comprise as basic components the following ingredients in the percentages by weight as listed:

| | |
|---|---|
| styrene-unsaturated hydrocarbon-styrene block copolymer | 30-50% |
| tackifying resin | 35-50% |
| reinforcing resin | 0-10% |
| plasticizer | 5-20% |
| degradation inhibitor | 0-5%. |

As indicated previously, there are specific, preferred compositions within the above stated value ranges.

As regards the adhesive layers 18, the relevant test method for peel adhesion is PSTC-7, developed by the Pressure-Sensitive Tape Council and recognized by ASTM. Peel values from about 500 to 5000 grams per linear inch are useable in accorance with this invention on typical substrates, e.g., various metals, polyolefins, etc.

The block copolymers used in the invention are preferably styrene-isoprene-styrene block copolymers (S-I-S) and styrene-butadiene-styrene block copolymers (S-B-S) (see U.S. No. 3265765 the disclosure of which is incorporated herein by reference). Examples of usable commerially available S-I-S copolymers inclue "Europene T 190" (Enichem AMERICAS), "Kraton 1112", "Kraton 1320", and "Kraton 1107" (Shell Chemical Company) and S-B-S copolymers include "Kraton 1101" (Shell) and "Stereon 840A" (Firestone Synthetic Rubber Co.).

Tackifying resins, also called tackifiers, useful in formulating pressure-sensitive adhesives (PS adhesives) are a known class of materials and include polyterpene resins, coumarone-indene resins, hydrogenated hydrocarbon resins, rosin ester resins, hydrogenated rosins and the like brittle type resins, see U.S. Pat. Nos. 3,027,337, 3,787,531 and 3,987,002. Examples of usable commerially available tackifying resins include "Piccolyte C135", "Foral 85" and "Staybellite Ester 10" (Hercules, Inc.), and "Super Nevtac 99" and "Nevta 130" (Neville Chemical Co.).

Reinforcing resins for PS adhesives are a known class of materials and include phenolic resins, polyvinyl butyral resins, etc. Examples of usable commercially available materials include "Harwick DA-50-002" (Harwick Chemical Co.), "Amoco 18-290" (Amoco Chemical Co.) an "Endex 160" (Hercules, Inc.).

Plasticisers for PS adhesives are a known class of materials and include paraffinic hydrocarbons, aromatic hydrocarbons, esters of alphatic and aromatic acids, etc. Examples of usable commercially available materials include dioctyl phthalate, "Hercolyn D" (Hercules, Inc.), "Neville NP10" (Neville Chemical Co.), "Wingtack 10" (Goodyear Chemicals Co.), "Shellflex 371" (Shell Chemical Co.), "Tufflo 6056" (ARCO Chemical Co.) an "Jayflex DINA" (Exxon Chemical Co.).

Degradation and depolymerization inhibitors for PS adhesives are a known class of materials and include antioxidants, e.g., hindered phenols, heat stabilizers, etc. Examples of usable commercially available materials include "Irganox 1010" (Ciba-Geigy Corp.) and "Ethanox 330" (Ethyl Corp.) and "Borg-Warner 626" an "Borg-Warner TNPP" (Borg-Warner Chemical Co.).

EXAMPLE 1

A hot melt PS adhesive was prepared from the following ingredients in the indicated percentages by weight:

| Ingredient | Commercial Product | Percentage |
|---|---|---|
| S-I-S Block Copolymer | "Europrene T190" | 29% |
| S-I-S Block Copolymer | "Kraton 1112" | 11% |
| Reinforcing resin | "Endex 160" | 5% |
| Hindered phenol antioxidant | "Irganox 1010" | 1% |
| Polyterpene tackifier | "Piccolyte C-135" | 5% |
| Rosin ester tackifier | "Hercolyn D" | 5% |
| Polyterpene tackifier | "Piccolyte C-115" | 33% |
| Paraffinic plasticizer | "Shellflex 371" | 11% |

The resulting adhesive is applied using a conventional hot melt coating technique as continuous layers on both sides of a soft temper foil of aluminum alloy (Al 99.5%, Si 0.5%) having aa approximate thickness of 5 mil, a tensile strength of 12,000 psi. and a yield strength of 4,000 psi. Both exposed surfaces of the applied adhesive layers were then covered with commercially available release liner sheets having a thickness of about 1 mil and the resulting five layer laminated product was rolled into continuous length rolls. These rolls where then shipped to another location where, using conventional sheet handling and laminating equipment, one of release liners were stripped off the product as it was unrolled an its exposed adhesive surface was laminated by heat and pressure to needlepressed, nonwoven polyolefin fiber carpeting of about 0.25" forming a continuous length, five layer carpet assembly.

The resulting carpet assembly was rolled into rolls of predetermined length which were then transported to another work station. Here, flat sections of predetermined size where cut therefrom and the cut sections were coldpressed into a predetermined three-dimensional contour followed by packaging for shipment, first to a warehouse and then to an automobile assembly plant. At such plant, the release liners covering the pressure-sensitive adhesive on the back sides of the 3-D carpet products were removed and the product then applied to automobile panels for which they had been previously contoured. The carpet products were found at the assembly plant, following appreciable storage time in the warehouse, to be consistently within dimensional specifications for installation, i.e., less than 1 millimeter error in dimension. Further, periodic inspection of assemblied automobiles revealed no appreciable shrinkage or other distortion of of the panel installed carpet covering.

EXAMPLE 2

The operations of Example 1 were repeated using the following adhesive composition in place of that recited in that example:

| Ingredient | Commercial Product | Percentage |
|---|---|---|
| S-B-S Block Copolymer | "Kraton 1101" | 21% |
| S-B-S Block Copolymer | "Stereon 840A" | 6% |
| S-I-S Block Copolymer | "Kraton 1107" | 3% |
| Reinforcing resin | "Endex 160" | 2% |
| Reinforcing resin | "Harwick DA-50-002" | 1% |
| Phosphite antioxidant | "Borg-Warner 626" | 1% |
| Hindered phenol antioxidant | "Ethanox 330" | 1% |
| Hydrocarbon resin tackifier | "Piccotac C135" | 40% |
| Rosin ester tackifier | "Stabellite Ester 10" | 5% |
| Polyterpene tackifier | "Wingtack S-10" | 5% |
| Paraffinic plasticizer | "Tufflo 6056" | 5% |
| Paraffinic ester plasticizer | "Jayflex DINA" | 10% |

Similar results to those reported in Example 1 were experienced in the installation and use of the carpet products of this Example 2.

The embodiments of the invention in which an exclusive property or privilege is claimed are defined as follows:

1. A new peel-and-stick carpet assembly capable of being formed and reformed mechanically or by hand without requiring application of heat thereto into a stable three-dimensional contoured shape that does not exhibit any appreciable shrinkage or stretching and will remain substantially unchanged in any of its three dimensions throughout storage prior to application to a substrate to be covered thereby and during normal life of use thereof after such application which comprises:
   a carpet layer having a front surface and a rear surface,
   a shape-retention web of thickness between about 1 to 100 mil having a front surface and a rear surface,
   a first adhesive layer of thickness between about 1 to 30 mil sandwiched between said carpet layer rear surface and said web front surface adhering said web to said carpet layer,
   a second adhesive layer of thickness between about 1 to 20 mil covering said rear surface of said web, and
   a release sheet of thickness between about 1 to 10 mil releasably adhered to said second adhesive layer,
   said first adhesive layer being formed from a hot melt adhesive composition comprising the following ingredients in the percentages by weight as listed:

| styrene-unsaturated hydrocarbon-styrene | |
|---|---|
| block copolymer | 30-50% |
| tackifying resin | 35-50% |
| reinforcing resin | 0-10% |
| plasticizer | 5-20% |
| degradation inhibitor | 0-5%, | said second adhesive layer being the same as or different from said first adhesive layer formed from hot melt adhesive having said composition, and
   said web being a metallic sheet or mesh.

2. A new peel-and-stick carpet assembly capable of being formed and reformed mechanically or by hand without requiring application of heat thereto into a stable three-dimensional contoured shape that does not exhibit any appreciable shrinkage or stretching and will remain substantially unchanged in any of its three dimensions throughout storage prior to application to a substrate to be covered thereby and during normal life of use thereof after such application which comprises:
   a carpet layer having a front surface and a rear surface,
   a shape-retention metallic web of thickness between about 1 to 100 mil having a front surface and a rear surface,
   a first adhesive layer of thickness between about 1 to 30 mil sandwiched between said carpet layer rear surface and said web front surface adhering said web to said carpet layer,
   a second adhesive layer of thickness between about 1 to 20 mil covering said rear surface of said web, and
   a release sheet of thickness between about 1 to 10 mil releasably adhered to said second adhesive layer,
   said first and second adhesive layers being formed from hot melt adhesives having compositions of the following ingredients in the percentages by weight as listed:

| styrene-unsaturated hydrocarbon-styrene block copolymer | 30-45% |
|---|---|
| tackifying resin | 35-50% |
| reinforcing resin | 1-10% |
| plasticizer | 5-20% |
| degradation inhibitor | 0-5% | said metallic web being an aluminum metal foil having a tensile strength of between about 10,000 to 45,000 psi. and a yield strength of between about 4,000 to 37,000 psi.

3. The carpet assembly of claim 2 wherein said foil is formed of an aluminum alloy containing at least about 95% aluminum.

4. The carpet assembly of claim 3 wherein said adhesive composition consists essentially of the following ingredients in the percentages by weight as listed:

| | |
|---|---|
| styrene-unsaturated hydrocarbon-styrene block copolymer | 30-40% |
| tackifying resin | 40-50% |
| reinforcing resin | 1-10% |
| plasticizer | 5-20% |
| degradation inhibitor | 1-5%. |

5. The carpet assembly of claim 4 wherein said styrene-unsaturated hydrocarbon-styrene block copolymer is a styrene-isoprene-styrene block copolymer or a styrene-butadiene-styrene block copolymer.

6. A new laminated product for use in construction of peel-and-stick carpet assemblies capable of being formed and reformed mechanically or by hand without requiring application of heat thereto into a stable three-dimensional contoured shape that does not exhibit any appreciable shrinkage or stretching and will remain substantially unchanged in any of its three dimensions throughout storage prior to application to a substrate to be covered thereby and during normal life of use thereof after such application, said laminated product comprising:
- a shape-retention metallic web of thickness between about 1 to 100 mil having a front surface and a rear surface,
- a first pressure-sensitive adhesive layer of thickness between about 1 to 30 mil covering said web front surface,
- a second pressure-sensitive adhesive layer of thickness between about 1 to 20 mil covering said rear surface of said web, and
- a release sheet of thickness between about 1 to 10 mil releasably adhered to said second adhesive layer,
  said first pressure-sensitive adhesive layer being formed from a hot melt adhesive composition comprising the following ingredients in the percentages by weight as listed:

| styrene-unsaturated hydrocarbon-styrene | |
|---|---|
| block copolymer | 30-50% |
| tackifying resin | 35-50% |
| reinforcing resin | 0-10% |
| plasticizer | 5-20% |
| degradation inhibitor | 0-5%, | said second pressure-sensitive adhesive layer being the same as or different from said first adhesive layer formed from said hot melt adhesive composition, and
said web being a sheet or mesh of metal.

7. The laminated product of claim 6 wherein said web is a foil formed of an aluminum alloy containing at least about 95% aluminum.

8. A pressure-sensitive adhesive composition for making the laminated product of claim 6 which consists essentially of the following ingredients in the percentages by weight as listed:

| | |
|---|---|
| styrene-unsaturated hydrocarbon-styrene block copolymer | 30-50% |
| tackifying resin | 35-50% |
| reinforcing resin | 0-10% |
| plasticizer | 5-20% |
| degradation inhibitor | 0-5%. |

* * * * *